(12) United States Patent
Sayed et al.

(10) Patent No.: US 10,078,430 B2
(45) Date of Patent: Sep. 18, 2018

(54) PROVIDING BATCH OPERATIONS WITH AN AUXILIARY USER INTERFACE

(71) Applicant: VMware, Inc., Palo Alto, CA (US)

(72) Inventors: Imran Q. Sayed, San Carlos, CA (US); Radhika Rayadu Vooruvakili, Sunnyvale, CA (US); Eric A. Hulteen, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 259 days.

(21) Appl. No.: 13/826,842

(22) Filed: Mar. 14, 2013

(65) Prior Publication Data

US 2014/0282141 A1    Sep. 18, 2014

(51) Int. Cl.
*G06F 3/0484* (2013.01)
*G06F 3/0481* (2013.01)
*G06F 9/455* (2018.01)
*G06F 9/451* (2018.01)

(52) U.S. Cl.
CPC ........ *G06F 3/04842* (2013.01); *G06F 3/0481* (2013.01); *G06F 9/455* (2013.01); *G06F 9/451* (2018.02)

(58) Field of Classification Search
CPC ..... G06F 3/04842; G06F 9/455; G06F 3/0481
USPC ......................................... 715/765, 780, 808
See application file for complete search history.

(56) References Cited

U.S. PATENT DOCUMENTS

| | | | |
|---|---|---|---|
| 7,506,265 B1* | 3/2009 | Traut et al. .................... 715/763 |
| 8,667,019 B2* | 3/2014 | Mehra ............... G06F 17/30286 |
| | | | 707/790 |
| 2004/0230599 A1* | 11/2004 | Moore et al. ................. 707/102 |
| 2006/0036946 A1* | 2/2006 | Radtke .................... G06F 17/24 |
| | | | 715/711 |
| 2006/0074866 A1* | 4/2006 | Chamberlain ........ G06F 17/246 |
| 2006/0143256 A1* | 6/2006 | Galchev ................ G06F 12/084 |
| 2008/0066020 A1* | 3/2008 | Boss et al. ..................... 715/968 |
| 2010/0281390 A1* | 11/2010 | Kurtz et al. ................... 715/738 |
| 2012/0072910 A1* | 3/2012 | Martin ................ G06F 9/45533 |
| | | | 718/1 |
| 2012/0078949 A1* | 3/2012 | Allen ................ G06F 17/30539 |
| | | | 707/769 |
| 2013/0104020 A1* | 4/2013 | Patterson et al. ............. 715/219 |
| 2014/0108700 A1* | 4/2014 | Li ............................ G06F 12/02 |
| | | | 711/6 |

* cited by examiner

*Primary Examiner* — Justin R. Blaufeld

(57) ABSTRACT

A method for presenting an auxiliary user interface is described. A primary user interface comprising a plurality of objects is presented. In response to selecting a portion of the plurality of objects, access is granted to an auxiliary user interface. An auxiliary user interface is presented that allows for batch modification of the portion of the plurality of objects.

20 Claims, 8 Drawing Sheets

110

500

```
┌─────────────────────────────────────────────────┐
│         PRESENT A PRIMARY USER INTERFACE        │
│                       510                       │
└─────────────────────────────────────────────────┘
                         │
                         ▼
┌─────────────────────────────────────────────────┐
│  PRESENT THE AUXILIARY USER INTERFACE IN RESPONSE TO │
│ SELECTING A SECOND PLURALITY OF OBJECTS FROM THE FIRST│
│                 PLURALITY OF OBJECTS             │
│                       520                       │
└─────────────────────────────────────────────────┘
```

DETERMINE COMMON DATA TYPES OF OBJECTS COMPRISED WITHIN THE PORTION OF THE PLURALITY OF OBJECTS
530

ANCHOR THE AUXILIARY INTERFACE TO AN ELEMENT PRESENTED IN THE PRIMARY USER INTERFACE
540

CREATE THE AUXILIARY USER INTERFACE BASED AT LEAST UPON METADATA ASSOCIATED WITH THE PORTION OF THE PLURALITY OF OBJECTS
550

FIG. 5

PROVIDING BATCH OPERATIONS WITH AN AUXILIARY USER INTERFACE

BACKGROUND

Robust datacenters require management and monitoring software. With increasingly large datacenters, including cloud datacenters, the software that manages and monitors these datacenters must be scalable. Conventionally, management and monitoring software employs batch operations that require little user input. If user input is required, typically a custom user interface must be designed to perform the batch operation. Designing custom user interfaces is often time consuming and costly.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 5 is a flow diagram of another method of presenting an auxiliary user interface, in accordance with various embodiments.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "presenting," "granting," "determining," "anchoring," "creating," or the like, often refer to the actions and processes of an electronic computing device or system, such as one or more physical and/or virtual machines, of a target computing environment. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Herein various systems, methods and techniques for presenting an auxiliary user interface are described which allow for batch modification of a plurality of objects. Rather than programming new user interfaces to allow for batch modifications, some of the embodiments described herein discuss an auxiliary user interface that is created based upon a primary user interface typically used to edit a single object. Herein various actions and outputs are presented to a "user" which may be based on the type of objects being modified. It should be appreciated that such a "user" is typically an IT professional or other person who performs IT management functions within a target computing environment.

Discussion begins with a system that presents a user with a list of objects, a primary user interface, and an auxiliary user interface. Next, example components used to create an auxiliary user interface are discussed briefly. Discussion continues with example data types. Mitigation of human errors is then briefly discussed. Discussion continues with example methods of use. Lastly, an example computing environment is discussed.

Example Primary and Auxiliary User Interfaces

Figure 1:
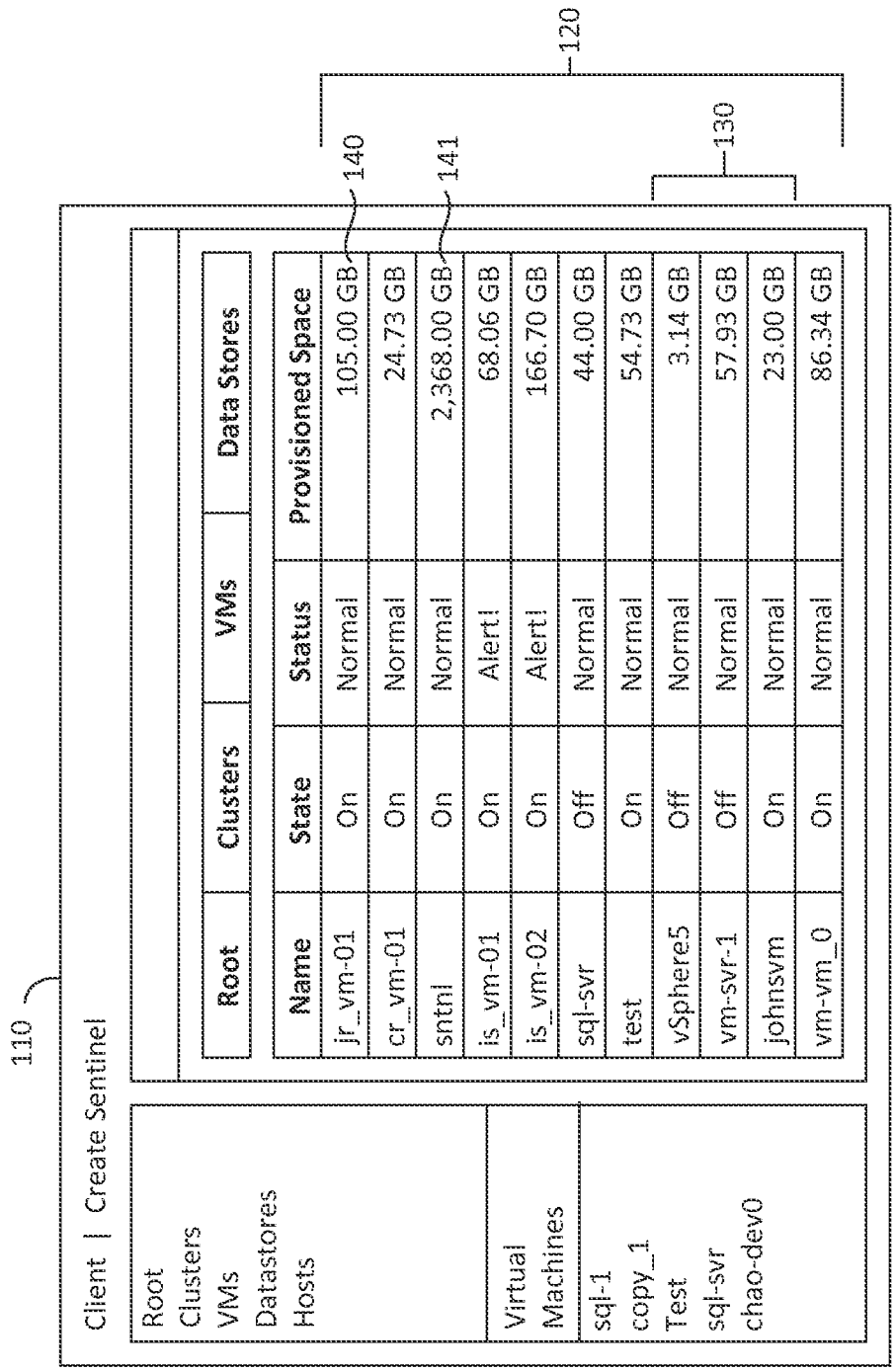
FIG. 1 is an example block diagram illustrating a list of objects that may be edited, in accordance with an embodiment.

FIG. 1 is an example block diagram that illustrates a list of objects that may be edited. The list of objects 110 comprises a plurality of objects 120. FIG. 1 also illustrates a sentinel object 141, which is an object presented in a user interface in the form of single object 140, but comprises a group of objects 130. Sentinel objects 141 will be discussed below in greater detail. Objects may be selected in a variety of ways. For example, a user may select a group of objects 130 from list of objects 110 by clicking on them with a cursor. As another example, a user may type in the names of objects to be selected.

Figure 2A:
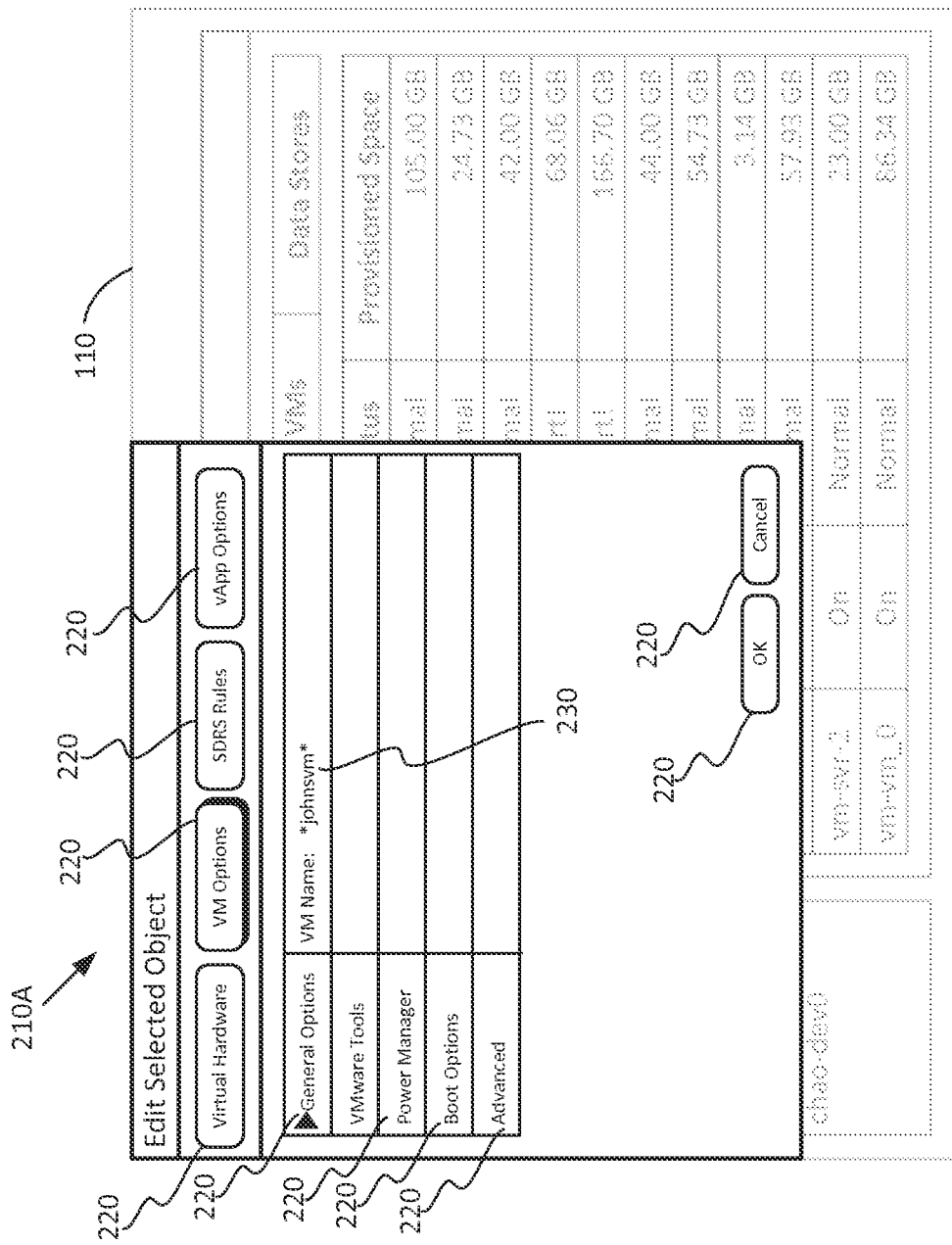
FIGS. 2A-2C are example block diagrams illustrating example user interfaces, in accordance with various embodiment.

FIG. 2A shows an example block diagram illustrating example primary user interface 210A, in accordance with various embodiments. Whether a group of objects 130, of the plurality of objects 120, are selected to be edited, or a single object 140, of the plurality of objects 120, is selected to be edited, the same primary user interface 210A is used. Primary user interface 210A may edit one object 140, or multiple objects when an object behaves as a sentinel object 141, as will be discussed below. In some embodiments, list of objects 110 remains in the background while the primary user interface 210A is presented. For purposes of brevity and clarity, it should be appreciated that primary user interface 210 is referred to as primary user interface 210A in FIG. 2A, primary user interface 210B in FIG. 2B, and primary user interface 210C in FIG. 2C. Specifically, primary user interfaces 210A-C illustrate different embodiments of primary user interface 210.

As shown in FIG. 2A, a primary user interface 210A comprises one or more elements 220 and one or more values 230 that are associated with either one object 140 or a group of objects 130 that have been selected for editing. Elements 220 allow a user to edit at least one object and/or manipulate data associated with at least one object. Elements 220 may include, but are not limited to: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc. In various embodiments, a user primary user interface 210 may be populated with elements 220 based on the type of object(s) selected to be edited. For example, if a group of objects 130 comprises virtual machines with hard disk drives, a primary user interface 210 may be populated with elements 220 that may be used to add or remove a hard disk drive.

Values 230 are data associated with at least one machine. For example, a value 230 may include, but is not limited to: the amount of virtual memory residing on an object, the hardware associated with an object, the amount of resources available on a collection of objects, the name of an object, etc. In some embodiments, values 230 are shown within an element 220 such as a text box. In some embodiments, a value 230 may be a label, in which case the value 230 is also an element 220.

Figure 2B:
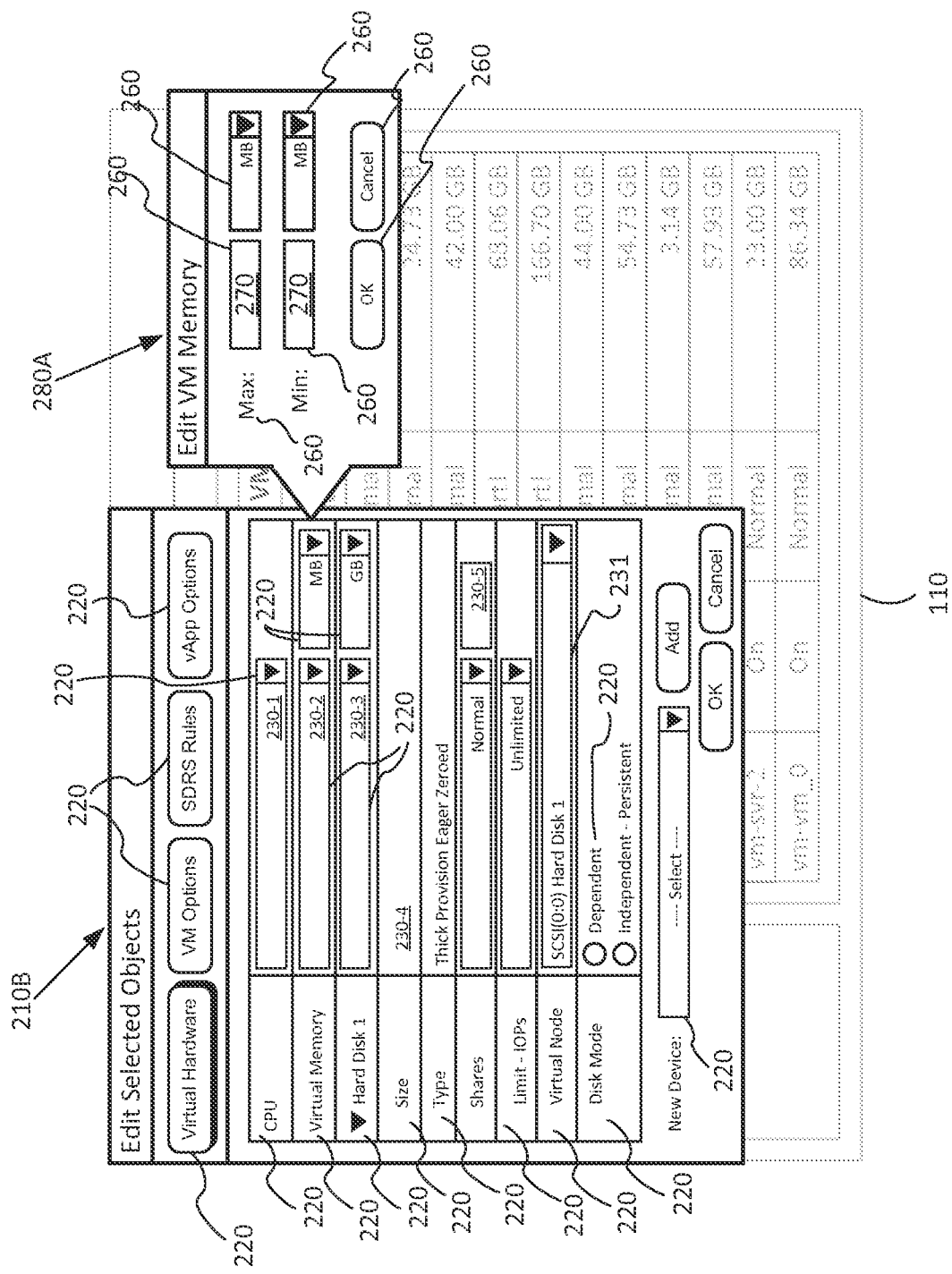

FIG. 2B shows an example block diagram illustrating example user interfaces (i.e., 210B and 280A). In response to selecting a group of objects 130 from the list of objects 110, access to an auxiliary user interface 280A is granted. Auxiliary user interfaces 280 allow for batch modification of all or a portion of a group of objects 130. Note that a group of objects 130 (also referred to herein as a portion of objects, and a second plurality of objects) may comprise the entire plurality of objects 120. In various embodiments described herein, objects may comprise virtual computing environments. Also, in some embodiments, list of objects 110 remains in the background while the primary user interface 210 and the auxiliary user interface 280 are presented. For purposes of brevity and clarity, it should be appreciated that auxiliary user interface 280 is referred to as auxiliary user interface 280A in FIG. 2B, and auxiliary user interface 280B in FIG. 2C. Specifically, auxiliary user interfaces 280A and 280B illustrate different embodiments of auxiliary user interface 280.

With continued reference to FIGS. 2A and 2B, in various embodiments, the same primary user interface 210 used to edit single objects 140 can edit a group of objects 130. Editing a group of objects 130 is commonly referred to as a batch modification. In some cases, the auxiliary user interface 280 is presented by default when a group of objects 130 are selected to be edited.

The auxiliary user interface 280 has one or more elements 260. In some embodiments, elements 260 may have a format that is similar to, or identical to, the primary user interface elements 220 when editing a single object 140. As with elements 220 presented on a primary user interface 210, elements 260 presented on an auxiliary user interface 280 may include, but are not limited to: buttons, widgets, controls, text boxes, radio buttons, tri-state boxes, list boxes, numerical input boxes, tool bars, sliders, spinners, drop-down lists, accordion lists, menus, menu bars, tool bars, icons, scroll bars, labels, tooltips, balloon help, status bars, progress bars, etc.

In various embodiments, an auxiliary user interface 280 may be populated with elements 260 based on the type of object(s) selected to be edited. For example, if a group of objects 130 comprises virtual machines with hard disk drives, an auxiliary user interface may be populated with elements 260 that may be used to add or remove a hard disk drive. Similarly, values 270 presented on an auxiliary user interface 280 may include the same types of values 230 presented on a primary user interface 210 including, but not limited to: the amount of virtual memory residing on an object, the hardware associated with an object, the amount of resources available on a collection of objects, the name of an object, etc. In some embodiments, values 270 are shown within an element 260 such as a text box. In some embodiments, a value 270 may be a label, in which case the value 270 is also an element 260. By using an auxiliary user interface 280 to modify a group of objects 130 that have been selected for editing, the design, development and quality assurance costs of remain low since there is no need to program a new primary user interface 210. Instead, the primary user interface 210 can remain the same, and the auxiliary user interface 280 is presented as required by user actions.

In various embodiments, auxiliary user interface 280 may be created automatically based at least in part on primary user interface 210. For instance, auxiliary user interface 280 may be created based at least upon metadata associated with a group of objects 130 selected by a user, what values 230 are populated in the primary user interface 210, or data provided by primary user interface 210. This metadata may comprise data regarding, but not limited to: elements 220, values 230 (e.g., object names, resources available, etc.), a graphical user interface format, etc.

In some embodiments, auxiliary user interface 280 may be shown as a layered or super-imposed graphical user interface. For instance, FIG. 2B shows an auxiliary user interface 280A that is anchored to an element 220 for editing an amount of memory. Additional auxiliary user interfaces 280 may be anchored to elements 220 located on primary user interface 210. In various embodiments, values 270 presented on an auxiliary user interface 280 may correspond to values 230 that are presented on a primary user interface 210. For example, a default value 270 may be a copy of a value 230 presented in the primary user interface 210. In various embodiments, elements 260 populated in an auxiliary user interface 280 are based on a data type. For instance, elements 260 found in an auxiliary user interface 280 would be different for editing a number as opposed to a string, but elements 260 would not differ between a VM configuration editor and a host configuration editor, even though they are different objects. Similarly, values 230 and 270 in both cases would have the same format. A more detailed discussion of data types is presented below in a separate sub-section.

Figure 2C:
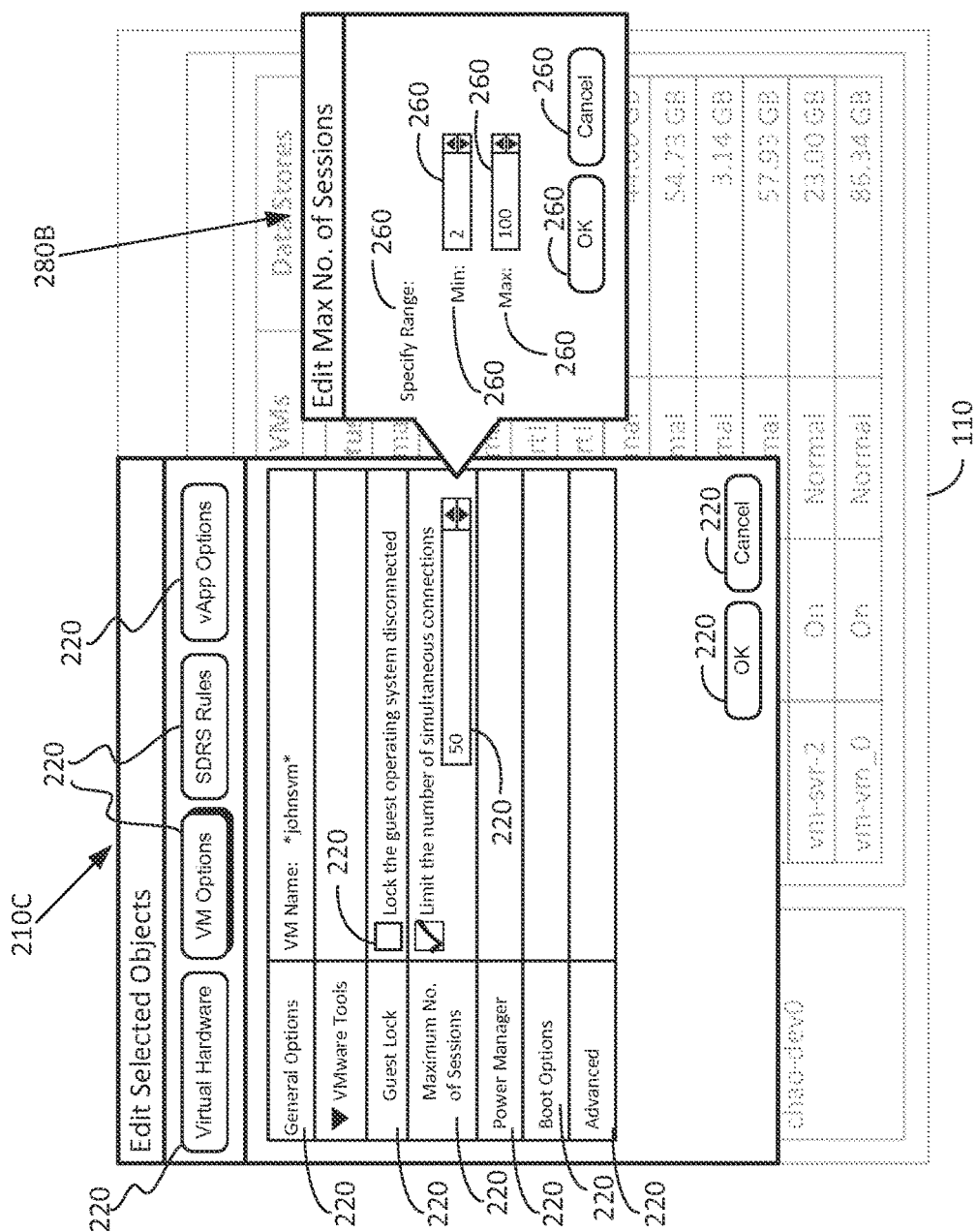

FIG. 2C shows an example block diagram illustrating example user interfaces (i.e., 210C and 280B). Similar to FIG. 2B, FIG. 2C illustrates an example of an auxiliary user interface 280B anchored to an element 220 presented on the primary user interface 210C. In one embodiment, elements 220 found in a primary user interface 210 may be used to create an auxiliary user interface 280. In other words, an auxiliary user interface 280 may be based at least in part on a primary user interface 210. For example, if the VM Maximum Number of Sessions value is displayed with an up-down numeric field element 220, then the auxiliary user interface 280B may present numeric fields that allow a user to set the minimum and maximum possible values of the up-down numeric field element 220 presented on the primary user interface 210C. Similarly, if a primary user interface 210 presents an element that allows a user to modify the name of an object, auxiliary user interface 280 may present options that allow a user to uniquely name each object in a group of objects 130.

In some embodiments, an auxiliary user interface 280 may be designed without regard for the primary user interface 210, instead of being created based upon the primary user interface 210.

In various embodiments, operations performed on a group of objects 130 (i.e., batch operations), are indefinitely scalable. In other words, the group of objects 130 that the operation is performed on could be very large (e.g., 1,000 VMs, 50,000 VMs, or more). To perform this, in some embodiments, the auxiliary user interface 280 obtains data related to the group of objects 130 by utilizing a query, rather than utilizing an explicit enumeration of the group of objects 130. Resources are saved by using this technique. Thus, in some embodiments, the auxiliary user interface 280 would not show actual data related to a single object 140 or a group of objects 130 that has/have been selected for editing.

In various embodiments, when a small group of objects 130 (e.g., 2, 10, 100) is selected, the auxiliary user interface 280 may show data related to a single object 140 and/or a group of objects 130. For example, auxiliary user interface 280 may display the average values 270 (e.g., mean, median, or mode), or common values 270. As another example, auxiliary user interface 280 may show that the selected VMs all have 4 Gb of memory and a 2 Tb HDD.

In some embodiments, a sentinel object 141 may be used. The sentinel object 141 appears and behaves like a single object 140, but has different properties. In some embodiments, the sentinel object 141 is a group of objects 130. In some embodiments, while selecting a group of objects 130, an option is presented to create a sentinel object 141. In some embodiments, an auxiliary user interface 280 appears to allow for the modification of a single object 140, and upon entry of a modification a group of objects 130 are modified.

In some embodiments, the sentinel object 141 may require a particular type of object. For example, all objects within a group of objects 130 must be VMs in order to create a sentinel object 141. In some embodiments, this sentinel object 141 may be edited by primary user interface 210 rather than auxiliary user interface 280. This allows a primary user interface 210 to edit a group of objects 130. In an embodiment, individual commands to the sentinel object 141 are broken down and forwarded to a service application programming interface (API). In such a case, an operation invocation code would be aware of the sentinel nature of the object.

Example Auxiliary User Interface Generator

Figure 3:
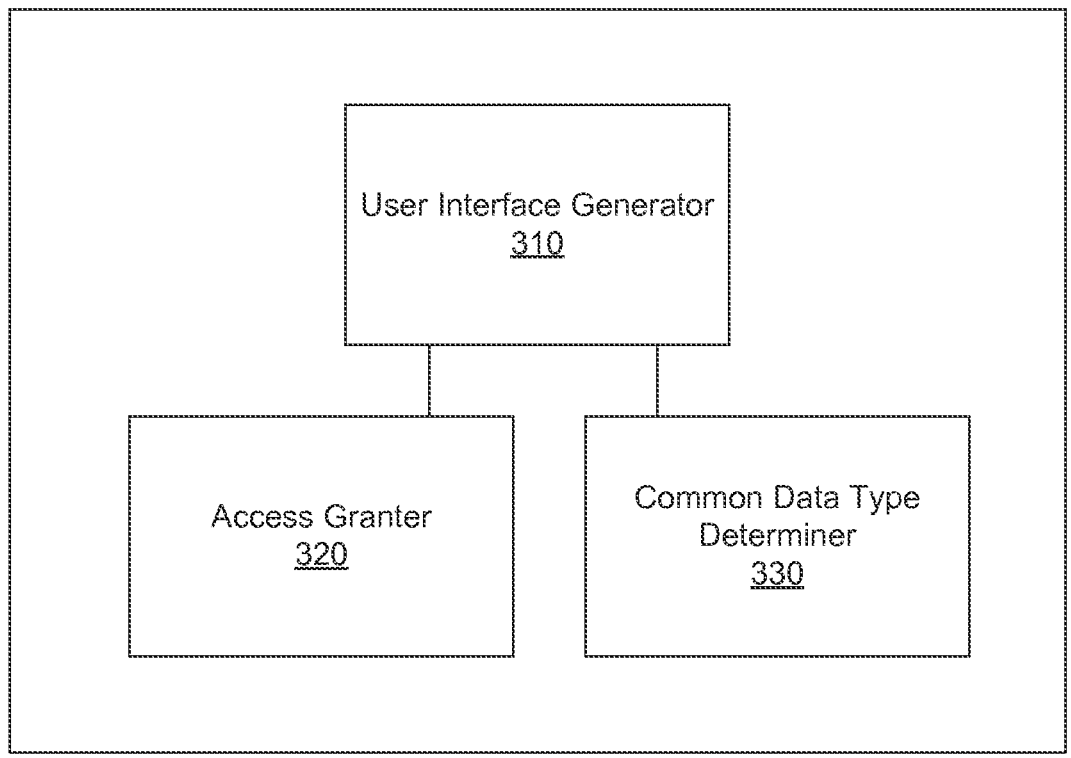
FIG. 3 is an example block diagram illustrating components used to create an auxiliary user interface, in accordance with an embodiment.

FIG. 3 shows an example block diagram illustrating example components used to create an auxiliary user interface 280, in accordance with an embodiment. As discussed herein, auxiliary user interface 280 may be created based upon metadata associated with a primary user interface 210 or a group of objects 130. FIG. 3 comprises a user interface generator 310, an access granter 320, and a common data type determiner 330.

User interface generator 310 is operable to generate a primary user interface 210 and/or an auxiliary user interface 280. While some user interfaces are created by a programmer, user interface generator 310 may create user interfaces based upon metadata such as data types. For example, user interface generator 310 may determine that all objects in a selected group of objects 130 comprise 2 Gb of virtual memory. As a result, user interface generator 310 may present an element 220 and/or 260 associated with virtual memory.

Access granter 320 is operable to grant access to an auxiliary user interface 280 in response to selecting a group of objects 130 from a plurality of objects 120, wherein the auxiliary user interface 280 allows for batch modification of the group of objects 130. In contrast, in some embodiments, when only a single object 140 is selected, access to an auxiliary user interface 280 is not granted. In some embodiments, access granter 320 is coupled with user interface generator 310. Also, as discussed above, in some embodiments, a sentinel object 141 may be modified without auxiliary user interface 280.

Common data type determiner 330, in some embodiments, is operable to determine common data types of objects comprised within a group of objects 130. In various embodiments, common data type determiner 330 is coupled with user interface generator 310. As an example, common data type determiner 330 may determine that every object has a name that uses a string data type. Common data type determiner 330 may pass this information along to user interface generator 310 such that user interface generator 310 will add elements 220 and/or 260 that allow a user to modify the name of one or more machines. Similarly, common data type determiner 330 may recognize that a portion of the group of objects 130 that have been selected all comprise a Boolean variable. In such a case, common data type determiner 330 may pass information to the user interface generator 310 such that the generated user interface comprises an element 220 and/or 260 that is a check box, or another element 220 and/or 260 capable of modifying Boolean variables.

Example Data Types

In various embodiments, elements 260 are used that correspond to the type of data to be displayed and edited. For example, a text box element 260 can be used for strings, which would be different from a numerical value element 260 for integer, etc. In various embodiments, objects 140 are associated with at least one data type. In some embodiments, an auxiliary user interface 280 is populated with elements 260 based at least on at least one data type.

Again referring to FIG. 2B, in various embodiments, when a group of objects 130 comprise values 230 that are not identical, certain values 230 may be presented by default. A value 230-2 may describe the size of the virtual memory in a VM. For instance, if 400 out of 500 VMs selected for editing have 2 Gb of virtual memory, the primary user interface 210 and/or the auxiliary user interface 280 may display 2 Gb of virtual memory by default as a value 230 populated within a "memory" field element 220 and/or 260. In some embodiments, an average (e.g., mean, median, or mode) may populate a value 230 or 270. For example, the average amount of HDD space 230-4 available in a group of objects 130 that have been selected for editing may be queried and shown as a value 230-4 populated as a label (or within a field element 220) associated with the size of a Hard Disk Drive.

In some embodiments, the number of objects being operated on affects the auxiliary user interface 280. For example, when the group of objects 130 is below a particular threshold that provides efficient computing of the least common denominator (i.e., a value 270 which is common amongst a group of objects 130), the auxiliary user interface 280 will display the least common denominator. When the group of objects 130 being operated on is so large that it would be inefficient to retrieve the required values 270, the auxiliary user interface 280 may show nothing or default value when displaying values 270. In some embodiments, a default value 270 may be user specified. In an embodiment, an auxiliary user interface 280 indicates how many resources retrieving values 270 will consume. In some cases a user may choose whether to retrieve values 270 or show a default value 270.

Various elements 260 and values 270 may be utilized within an auxiliary user interface 280. Herein, primitives refer to single-value data types, and are reflected in the auxiliary user interface 280 by using single-field elements.

In an embodiment, strings can be divided into two types for batch editing. One type is referred to as a key, where the value 270 is unique among a group of objects 130. A non-key is a string that is not unique among a group of objects 130. For example, the name of an object may be a key, while the description of an object may be a non-key. A user may input a value in a text field of an auxiliary user interface 280, or a default may be used to modify objects wherein a general pattern fills the values 270 for all objects within a group of objects 130. In some embodiments, a user may save and reuse a particular pattern. In some embodiments, a user may enter and save default values 270 for later use. An example auxiliary user interface 280 that allows for the editing of strings is shown in FIG. 2A.

In some embodiments, two design options may be used to edit a key type string in-place. In a first option, in-place editing is enabled. In such a case, instructions may be provided on how to provide a single object 140 in a group of objects 130 with a unique key string. In some versions of this embodiment, editing the value 270 requires an auxiliary user interface 280 with editing instructions. In a second option, a notification is provided comprising a message that indicates that a default number sequencing will be applied in order to provide unique values for the group of objects 130. In that case, a message may be included within the auxiliary user interface 280. In some cases, a tooltip or a balloon message may be used to present a message or notification.

In an embodiment, elements 260 on an auxiliary user interface 280 for strings provide a replace option and an add option. The replace option provides the ability to replace a string or a common string expression across a group of objects 130. The add option allows appending or prepending text or adding a counter sequence. A counter sequence is a mechanism that appends or prepends a unique string to each object within a group of objects 130.

In an embodiment, batch operations for numbers follow one of two patterns: a value and a range. If a value pattern is utilized, a field can be set to the same value 230 for all objects within a group of objects 130 using in-place editing (e.g., editing the value 230 directly on a user interface). With a constraint pattern, upper and lower bounds are defined and if a value 230 or 270 is not within those bounds the value 230 and/or 270 is changed to the closest acceptable value. Note that various values 230 and/or 270 may be related such that if one value 230 and/or 270 changes, the bounds for another value 230 and/or 270 may change. For example, if the number of hard disk drives comprised within a group of objects 130 changes, then the memory associated with each object in the group of objects 130 may also change.

In an embodiment, batch operations for Boolean values do not require any auxiliary user interface 280. For example, a tri-state checkbox could indicate a mixed state between a group of objects 130, or indicate that all objects within a group of objects 130 are in a given state for a particular property (e.g., yes/no, true/false, I/O, etc.)

In an embodiment, a multi-option element 260 may be set in the unselected state by default. A multi-option element may include, but is not limited to: a combo box, a radio button, etc. In some embodiments, if all objects in a group of objects 130 have the same value for the value 270, a multi-option element 260 may be set to that value. In various embodiments, the element 260 on the auxiliary user interface 280 would have all values 270 selected upon initialization, except those that are disabled on the primary user interface 210. As discussed above, the values 270 selected upon initialization may dynamically change if another value 230 or 270 it corresponds with changes.

Composites 231 are multi-field objects. In other words, they are structured objects composed of primitive fields or other composite fields. In some embodiments, editing of composites 231 happens at the level of the primitive fields nested within a composite 231.

Collections of primitive or composite items are handled as an element 220 and/or 260 on their own. The primary user interface 210 displays the union of all the unique items across the group of objects 130, where uniqueness is based on some key property or index of the objects in the group of objects 130. In an embodiment, there are three types of batch operations on a collection: add, delete, and edit. The add operation adds a new item to the group of objects 130 (e.g., the new item is added to each object in a group of objects 130). The delete option deletes an item from the objects comprised within a group of objects 130 that comprise the item. The edit option edits items in a group of objects 130. If a single object 140 comprised within the group of objects 130 does not have a particular item, the item is added to that single object 140. Thus, a group of objects 130 that is heterogeneous may be homogenized. For example, if a CD drive is edited for a collection of VMs, VMs without the CD drive add the CD drive.

Mitigation of User Errors

Performing batch operations on many datacenter objects can cause misconfiguration or outages that are difficult to detect or roll back. There are various ways to mitigate this risk in either the primary user interface 210 or the auxiliary user interface 280. For example, an undo option may be provided to restore the settings on the group of objects 130 to what the settings were prior to the batch operation. In another example, a restore default settings option would restore the group of objects 130 to a default setting. Other examples include maintaining log files and/or taking snapshots of operations, and restoring to particular log file or snapshot, such as using a specified date. As another example, a confirm dialog may appear for operations that affect a group of objects 130. In some embodiments, there may be a setting to turn off this confirm dialog. Also, informational tooltips may be provided wherein additional information about the group of objects 130 that are targeted by an operation is provided.

Example Methods of Operation

Figure 4:
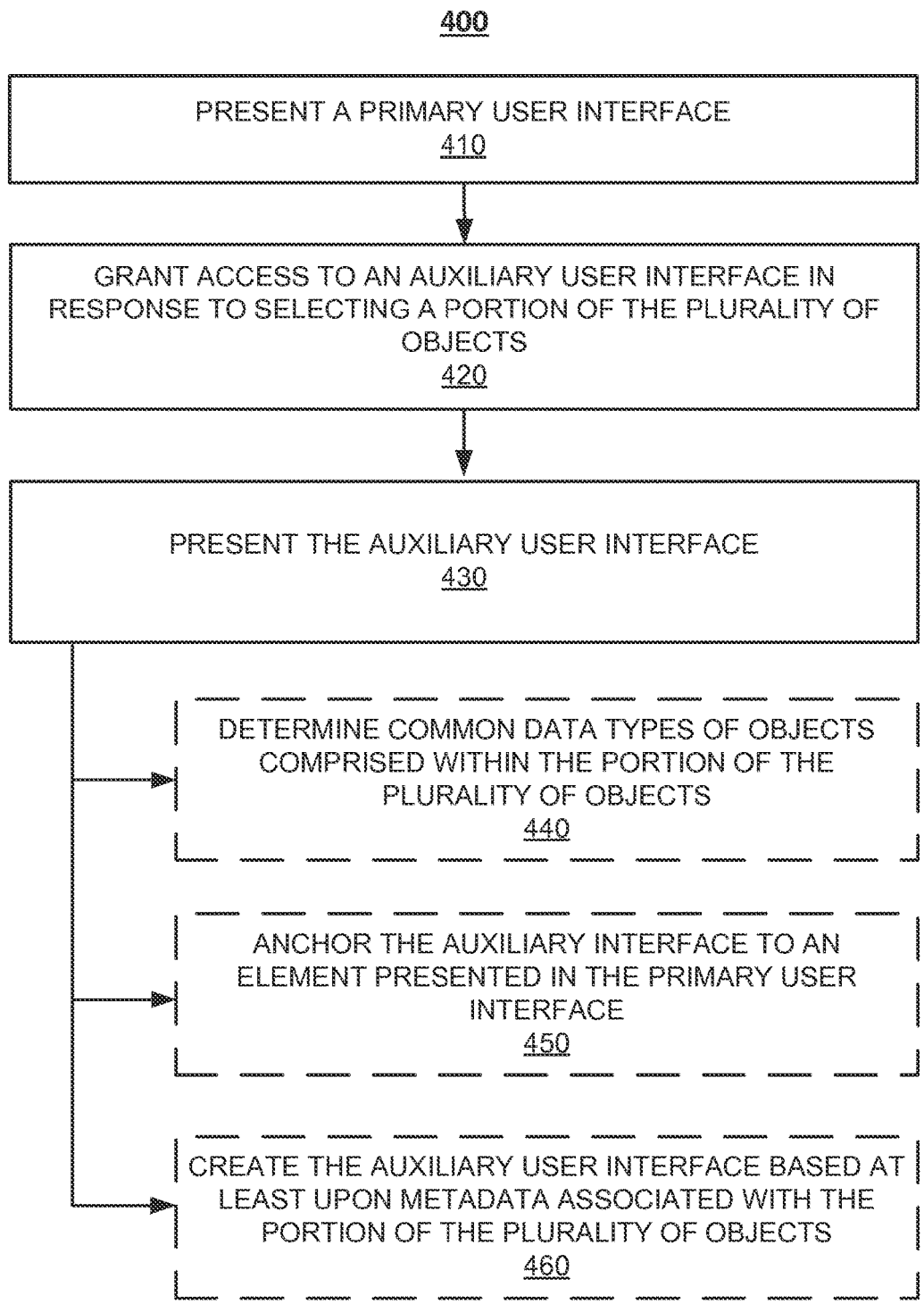
FIG. 4 is a flow diagram of a method of presenting an auxiliary user interface, in accordance with various embodiments.

The following discussion sets forth in detail the operation of some example methods of operation of embodiments. With reference to FIGS. 4 and 5, flow diagrams 400 and 500 illustrate example procedures used by various embodiments. Flow diagrams 400 and 500 include some procedures that, in various embodiments, are carried out by a processor under the control of computer-readable and computer-executable instructions. In this fashion, procedures described herein and in conjunction with flow diagrams 400 and/or 500 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/disks, and optical disks, any or all of which may be employed with computer environments and/or cloud based entities. The computer-readable and computer-executable instructions, which reside on tangible computer readable storage media, are used to control or operate in conjunction with, for example, one or some combination of processors of a system such as the one shown in FIG. 6, or those found in a cloud based environment. It is appreciated that the processor(s) may be physical or virtual or some combination (it should also be appreciated that a virtual processor is implemented on physical hardware).

Although specific procedures are disclosed in flow diagrams 400 and 500, such procedures are examples. That is, embodiments are well suited to performing various other procedures or variations of the procedures recited in flow diagrams 400 and/or 500. Likewise, in some embodiments, the procedures in flow diagrams 400 and/or 500 may be performed in an order different than presented and/or not all of the procedures described in one or more of these flow diagrams may be performed. It is further appreciated that procedures described in flow diagrams 400 and/or 500 may be implemented in hardware, or a combination of hardware with firmware and/or software.

FIG. 4 is a flow diagram 400 of a method of presenting an auxiliary user interface 280, in accordance with various embodiments.

At procedure 410 of flow diagram 400, in one embodiment, a primary user interface 210 is presented. In some embodiments, this primary user interface 210 is presented in response to a user selection of a group of objects 130 to edit or a single object 140 to edit from a list of objects 110. Objects may be housed in environments including, but not limited to: data centers, a cloud, a cluster of computers.

At procedure 420 of flow diagram 400, in one embodiment, in response to selecting a portion of the plurality of objects 120 (also referred herein as selecting a group of objects 130), access to an auxiliary user interface 280 is granted. In various embodiments, auxiliary user interface 280 is generated by populating auxiliary user interface 280 with elements 260 that correspond with elements 220 found in a primary user interface 210. Elements 220 may include settings or means to control settings including, but not limited to: device names, text boxes, memory sizes, integer select boxes, tri-state boxes, device properties, device descriptions, etc.

At procedure 430 of flow diagram 400, in one embodiment, an auxiliary user interface 280 is presented, wherein the auxiliary user interface 280 allows for batch modification of a portion of a plurality of objects 120. In various embodiments, portions of an auxiliary user interface 280 may correspond to elements 220 found on a primary user interface 210.

At procedure 440 of flow diagram 400, in some embodiments, a common data type of objects comprised within the portion (also known as the group) of objects 130 is determined. For example, if a group of objects 130 all comprise an editable amount of virtual memory, then the method determines that the group of objects 130 comprises an editable amount of virtual memory. This is discussed above and referred to as a lowest common denominator of objects. In some embodiments, after a common data type is determined, it is displayed on the primary user interface 210 and/or the auxiliary user interface 280. For example, if a group of objects 130 all comprised an editable amount of virtual memory, the primary user interface 210 and/or the auxiliary user interface 280 may display an element 220 and/or 260 and values 230 and/or 270 for virtual memory.

At procedure 450 of flow diagram 400, in some embodiments, an auxiliary user interface 280 is anchored to an element 220 presented in the primary user interface 210. For example, an auxiliary user interface 280 may present elements 260 that allow a user to define the maximum and minimum values of a drop-down list of numbers element 220 presented in the primary user interface 210. As another example, an auxiliary user interface 280 may be anchored to an element 220 that allows for the modification of the name of an object. In that case, the auxiliary user interface 280 may present elements which allow a user to use a counter sequence (e.g., a mechanism that appends a unique string to each string within a set of strings).

At procedure 460 of flow diagram 400, in some embodiments, an auxiliary user interface 280 is created based at least upon metadata associated with the group of objects 130. For example, if the group of objects 130 comprises single objects 140 that all contain virtual memory, the auxiliary user interface 280 (and in some cases the primary user interface 210) will present elements 220 and/or 260 related to virtual memory.

FIG. 5 is a flow diagram 500 of a method of presenting an auxiliary user interface 280, in accordance with various embodiments.

At procedure 510 of flow diagram 500, in one embodiment, a primary user interface 210 is presented. In various embodiments, a primary user interface 210 is presented upon the selection of at least one object 140 comprised within a list of objects 110.

At procedure 520 of flow diagram 500, in one embodiment, an auxiliary user interface 280 is presented in response to selecting a second plurality (also known as a group) of objects 130 from a first plurality of objects 120. For instance, a first plurality of objects 120 may comprise the list of objects 110 shown in FIG. 1. In an embodiment, an auxiliary user interface 280 allows a user to modify the second plurality of objects 130.

At procedure 530 of flow diagram 500, in one embodiment, common properties of objects comprised within the second plurality of objects 130 is determined. For example, if each object comprised within the second plurality of objects 130 has a CD drive, then a computer usable storage medium may determine that a CD drive is a common property. In other embodiment, if a portion of the objects comprised in the second plurality of objects 130 comprises a common property, that common property is determined. In various embodiments, some or all common properties are displayed on a primary user interface 210 and/or an auxiliary user interface 280.

At procedure 540 of flow diagram 500, in some embodiments, an auxiliary user interface 280 is anchored to an element 220 presented in the primary user interface 210. For example, an auxiliary user interface 280 may present elements 260 that allow a user to define the maximum and minimum values of a drop-down list of numbers element 220 presented in the primary user interface 210.

At procedure 550 of flow diagram 500, in some embodiments, an auxiliary user interface 280 is created based at least upon metadata associated with the portion of the second plurality of objects 130. For example, if the group of objects 130 comprises objects that all contain virtual memory, the auxiliary user interface 280 (and in some cases the primary user interface 210) will present elements 220 and/or 260 related to virtual memory.

Example Computer System

Figure 6:
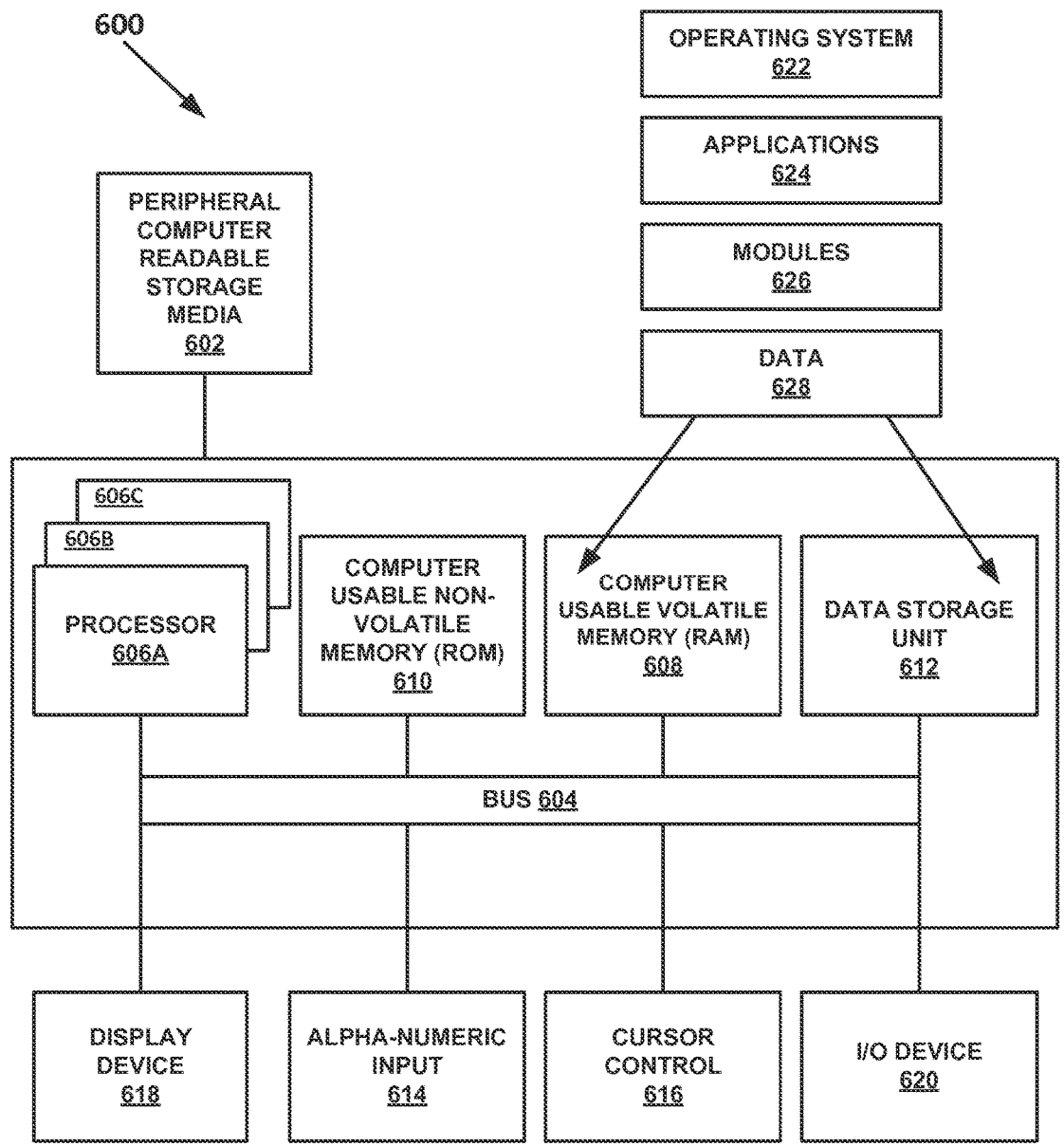
FIG. 6 is a block diagram of an example computer system used in accordance with various embodiments.

FIG. 6 is a block diagram of an example computing system used in accordance with various embodiments. With reference now to FIG. 6, all or portions of some embodiments described herein are composed of computer-readable and computer-executable instructions that reside, for example, in computer-usable/computer-readable storage media of a computer system. That is, FIG. 6 illustrates one example of a type of computer (computer system 600) that can be used in accordance with or to implement various embodiments which are discussed herein. It is appreciated that computer system 600 of FIG. 6 is an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, and the like. Computer system 600 of FIG. 6 is well adapted to having peripheral tangible computer-readable storage media 602 such as, for example, a floppy disk, a compact disc, digital versatile disc, other disc based storage, universal serial bus "thumb" drive, removable memory card, and the like coupled thereto. The tangible computer-readable storage media is non-transitory in nature.

System 600 of FIG. 6 includes an address/data bus 604 for communicating information, and a processor 606A coupled with bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g., random access memory (RAM), coupled with bus 604 for storing information and instructions for processors 606A, 606B, and 606C. System 600 also includes computer usable non-volatile memory 610, e.g., read only memory (ROM), coupled with bus 604 for storing static information and instructions for processors 606A, 606B, and 606C. Also present in system 600 is a data storage unit 612 (e.g., a magnetic or optical disk and disk drive) coupled with bus 604 for storing information and instructions. System 600 may also include an alphanumeric input device 614 including alphanumeric and function keys coupled with bus 604 for communicating information and command selections to processor 606A or processors 606A, 606B, and 606C. System 600 may also include cursor control device 616 coupled with bus 604 for communicating user input information and command selections to processor 606A or processors 606A, 606B, and 606C. In one embodiment, system 600 may also include display device 618 coupled with bus 604 for displaying information.

Referring still to FIG. 6, display device 618 of FIG. 6, when included, may be a liquid crystal device, cathode ray tube, plasma display device or other display device suitable for creating graphic images and alphanumeric characters recognizable to a user. Cursor control device 616, when included, allows the computer user to dynamically signal the movement of a visible symbol (cursor) on a display screen of display device 618 and indicate user selections of selectable items displayed on display device 618. Many implementations of cursor control device 616 are known in the art including a trackball, mouse, touch pad, touchscreen, button, joystick or special keys on alphanumeric input device 614 capable of signaling movement of a given direction or manner of displacement. Alternatively, it will be appreciated that a cursor can be directed and/or activated via input from alphanumeric input device 614 using special keys and key sequence commands. System 600 is also well suited to having a cursor directed by other means such as, for example, voice commands. System 600 also includes an I/O device 620 for coupling system 600 with external entities. For example, in one embodiment, I/O device 620 is a modem for enabling wired or wireless communications between system 600 and an external network such as, but not limited to, the Internet.

Referring still to FIG. 6, various other components are depicted for system 600. Specifically, when present, an operating system 622, applications 624, modules 626, and data 628 are shown as typically residing in one or some combination of computer usable volatile memory 608 (e.g., RAM), computer usable non-volatile memory 610 (e.g., ROM), and data storage unit 612. In some embodiments, all or portions of various embodiments described herein are stored, for example, as an application 624 and/or module 626 in memory locations within RAM 608, computer-readable storage media within data storage unit 612, peripheral computer-readable storage media 602, and/or other tangible computer-readable storage media.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A method of presenting an auxiliary user interface, said method comprising:

presenting a list of a plurality of objects that are selectable for editing, said plurality of objects comprising a plurality of virtual machines;

in response to a user selection of a portion of said plurality of objects to edit from said list, said portion comprising at least two virtual machines of said plurality of virtual machines, presenting a primary user interface comprising a first plurality of elements for batch editing values of settings of said at least two virtual machines of said portion of said plurality of objects, wherein at least one particular element of said first plurality of elements allows for batch editing data associated with a numeric range of virtual memory allocated to said at least two virtual machines within said primary user interface in response to receiving user input at said primary user interface modifying said data, and wherein said primary user interface overlies said list of said plurality of objects such that said list of said plurality of objects is partially obscured by said primary user interface wherein part of said list of said plurality of objects remains visible in a background while said primary user interface is presented;

receiving a selection of said particular element;

in response to said selection of said particular element of said first plurality of elements associated with said portion of said plurality of objects, granting access to an auxiliary user interface associated with said primary user interface;

presenting said auxiliary user interface, wherein said auxiliary user interface allows for batch modification of a numeric range associated with virtual memory allocated to said at least two virtual machines of said portion of said plurality of objects within said auxiliary user interface in response to receiving user input modifying boundaries of said range of virtual memory at said auxiliary user interface;

populating said auxiliary user interface with a second plurality of elements comprising input elements for receiving said boundaries of virtual memory to allocate to said plurality of virtual machines, and control elements for editing said boundaries, wherein said auxiliary user interface, said primary user interface and said part of said list of said plurality of objects are displayed in a same view such that said auxiliary user interface is displayed as layered over said primary user interface and over said part of said list of said plurality of objects and anchored to said particular element selected from said first plurality of elements, and wherein said part of said list of said plurality of objects is partially obscured by said auxiliary user interface wherein a non-obscured part of said list of said plurality of objects remains visible in said background while said auxiliary user interface is presented; and in response to receiving said boundaries at said input elements, editing an amount of said virtual memory to be allocated to said portion of said plurality of objects comprising said at least two virtual machines by changing, for any virtual machine whose current amount of virtual memory falls outside said range, to the closest amount within said range without changing any current amount of virtual memory allocated to any other virtual machines whose current amount of virtual memory is already within said range.

2. The method of claim 1, further comprising:
determining common data types of objects comprised within said portion of said plurality of objects.

3. The method of claim 1, further comprising:
creating said auxiliary user interface based at least upon metadata associated with said portion of said plurality of objects.

4. The method of claim 1, wherein said plurality of objects are associated with at least one data type, and wherein said auxiliary user interface is populated with elements based at least on said at least one data type.

5. The method of claim 4, wherein at least one element of said elements is populated with an average value of said data type of said objects.

6. The method of claim 1, wherein said auxiliary user interface is operable to modify a sentinel object.

7. The method of claim 1, wherein said presenting a primary user interface comprising a first plurality of elements for batch editing values of settings of said at least two virtual machines of said portion of said plurality of objects comprises:
provided said portion of said plurality of objects comprises values associated with an element of said first plurality of elements that are not identical, presenting a default value associated with said element for said portion of said plurality of objects within said primary user interface at said element.

8. The method of claim 7, wherein said default value comprises a mean value of said values associated with said element for said portion of said plurality of objects.

9. The method of claim 7, wherein said default value comprises a mode value of said values associated with said element for said portion of said plurality of objects.

10. The method of claim 7, wherein said default value comprises a median value of said values associated with said element for said portion of said plurality of objects.

11. The method of claim 1, wherein said presenting said auxiliary user interface comprises:
provided said portion of said plurality of objects comprises values associated with said particular element that are not identical, presenting a default value associated with said particular element for said portion of said plurality of objects within said auxiliary user interface at said element.

12. The method of claim 1, wherein said presenting said auxiliary user interface comprises:
determining whether a number of said portion of said plurality objects satisfies a threshold;
provided said number of said portion of said plurality of objects satisfies said threshold, presenting a least common denominator value associated with said particular element; and
provided said number of said portion of said plurality of objects does not satisfy said threshold, presenting no value associated with said particular element.

13. A non-transitory computer readable storage medium having instructions embodied therein that when executed cause a computing system to perform a method of presenting an auxiliary user interface, said method comprising:
presenting a list of a plurality of objects that are selectable for editing, said plurality of objects comprising a plurality of virtual machines;
in response to a user selection of a portion of said plurality of objects to edit from said list, said portion comprising at least two virtual machines of said plurality of virtual machines, presenting a primary user interface comprising a first plurality of elements for batch editing values of settings of said at least two virtual machines of said portion of said plurality of objects, wherein at least one particular element of said first plurality of elements allows for batch editing data associated with a numeric range of virtual memory allocated to said at least two virtual machines within said primary user interface in response to receiving user input at said primary user interface modifying said data, and wherein said primary user interface overlies said list of said plurality of objects such that said list of said plurality of objects is partially obscured by said primary user interface wherein part of said list of said plurality of objects remains visible in a background while said primary user interface is presented;
receiving a selection of said particular element;
in response to said selection of said particular element of said first plurality of elements associated with said portion of said plurality of objects, granting access to an auxiliary user interface associated with said primary user interface;
presenting said auxiliary user interface, wherein said auxiliary user interface allows for batch modification of a numeric range associated with virtual memory allocated to said at least two virtual machines of said portion of said plurality of objects within said auxiliary user interface in response to receiving user input modifying boundaries of said range of virtual memory at said auxiliary user interface;

populating said auxiliary user interface with a second plurality of elements comprising input elements for receiving said boundaries of virtual memory to allocate to said plurality of virtual machines, and control elements for editing said boundaries, wherein said auxiliary user interface, said primary user interface and said part of said list of said plurality of objects are displayed in a same view such that said auxiliary user interface is displayed as layered over said primary user interface and over said part of said list of said plurality of objects and anchored to said particular element selected from said first plurality of elements, and wherein said part of said list of said plurality of objects is partially obscured by said auxiliary user interface wherein a non-obscured part of said list of said plurality of objects remains visible in said background while said auxiliary user interface is presented; and in response to receiving said boundaries at said input elements, editing an amount of said virtual memory to be allocated to said portion of said plurality of objects comprising said at least two virtual machines by changing, for any virtual machine whose current amount of virtual memory falls outside said range, to the closest amount within said range without changing any current amount of virtual memory allocated to any other virtual machines whose current amount of virtual memory is already within said range.

14. The non-transitory computer readable storage medium of claim 13, wherein said auxiliary user interface is created based at least upon metadata associated with said portion of said plurality of objects.

15. The non-transitory computer readable storage medium of claim 13, wherein said objects are associated with at least one data type, and wherein said auxiliary user interface is populated with elements based at least on said at least one data type.

16. The non-transitory computer readable storage medium of claim 15, wherein at least one element of said elements is populated with a value associated with at least one data type of at least one object comprised within said plurality of objects.

17. A system for presenting an auxiliary user interface, the system comprising:
a data storage device; and
a processor communicatively coupled with said data storage device, said processor configured to:
present a list of a plurality of objects that are selectable for editing, said plurality of objects comprising a plurality of virtual machines;
in response to a user selection of a portion of said plurality of objects to edit from said list, said portion comprising at least two virtual machines of said plurality of virtual machines, present a primary user interface comprising a first plurality of elements for batch editing values of settings of said at least two virtual machines of said portion of said plurality of objects, wherein at least one particular element of said first plurality of elements allows for batch editing data associated with a numeric range of virtual memory allocated to said at least two virtual machines within said primary user interface in response to receiving user input at said primary user interface modifying said data, and wherein said primary user interface overlies said list of said plurality of objects such that said list of said plurality of objects is partially obscured by said primary user interface wherein part of said list of said plurality of objects remains visible in a background while said primary user interface is presented;

receive a selection of said particular element;

in response to said selection of said particular element of said first plurality of elements associated with said portion of said plurality of objects, grant access to an auxiliary user interface associated with said primary user interface;

present said auxiliary user interface, wherein said auxiliary user interface allows for batch modification of a numeric range associated with virtual memory allocated to said at least two virtual machines of said portion of said plurality of objects within said auxiliary user interface in response to receiving user input modifying boundaries of said range of virtual memory at said auxiliary user interface;

populate said auxiliary user interface with a second plurality of elements comprising input elements for receiving said boundaries of virtual memory to allocate to said plurality of virtual machines, and control elements for editing said boundaries, wherein said auxiliary user interface, said primary user interface and said part of said list of said plurality of objects are displayed in a same view such that said auxiliary user interface is displayed as layered over said primary user interface and over said part of said list of said plurality of objects and anchored to said particular element selected from said first plurality of elements, and wherein said part of said list of said plurality of objects is partially obscured by said auxiliary user interface wherein a non-obscured part of said list of said plurality of objects remains visible in said background while said auxiliary user interface is presented; and in response to receiving said boundaries at said input elements, edit an amount of said virtual memory to be allocated to said portion of said plurality of objects comprising said at least two virtual machines by changing, for any virtual machine whose current amount of virtual memory falls outside said range, to the closest amount within said range without changing any current amount of virtual memory allocated to any other virtual machines whose current amount of virtual memory is already within said range.

18. The system of claim 17, said processor further configured to:
determine common data types of objects comprised within said portion of said plurality of objects.

19. The system of claim 17, wherein said auxiliary user interface is created based at least upon metadata associated with said portion of said plurality of objects.

20. The system of claim 17, wherein an object of said plurality of objects is associated with a data type, and wherein said auxiliary user interface is populated with components based at least on said data type.

* * * * *